US007610199B2

(12) United States Patent
Abrash et al.

(10) Patent No.: US 7,610,199 B2
(45) Date of Patent: Oct. 27, 2009

(54) METHOD AND APPARATUS FOR OBTAINING COMPLETE SPEECH SIGNALS FOR SPEECH RECOGNITION APPLICATIONS

(75) Inventors: Victor Abrash, Montara, CA (US); Federico Cesari, Menlo Park, CA (US); Horacio Franco, Menlo Park, CA (US); Christopher George, Los Osos, CA (US); Jing Zheng, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 754 days.

(21) Appl. No.: 11/217,912

(22) Filed: Sep. 1, 2005

(65) Prior Publication Data

US 2006/0241948 A1 Oct. 26, 2006

Related U.S. Application Data

(60) Provisional application No. 60/606,644, filed on Sep. 1, 2004.

(51) Int. Cl.
*G10L 15/14* (2006.01)

(52) U.S. Cl. ...................................... 704/233; 704/275

(58) Field of Classification Search ................. 704/233, 704/275

See application file for complete search history.

(56) References Cited

U.S. PATENT DOCUMENTS

| | | | | |
|---|---|---|---|---|
| 5,596,680 | A * | 1/1997 | Chow et al. | 704/248 |
| 5,692,104 | A * | 11/1997 | Chow et al. | 704/253 |
| 6,324,509 | B1 * | 11/2001 | Bi et al. | 704/248 |
| 7,139,707 | B2 * | 11/2006 | Sheikhzadeh-Nadjar et al. | 704/243 |
| 7,260,532 | B2 * | 8/2007 | Rees | 704/256 |

* cited by examiner

*Primary Examiner*—Susan McFadden

(57) ABSTRACT

The present invention relates to a method and apparatus for obtaining complete speech signals for speech recognition applications. In one embodiment, the method continuously records an audio stream comprising a sequence of frames to a circular buffer. When a user command to commence or terminate speech recognition is received, the method obtains a number of frames of the audio stream occurring before or after the user command in order to identify an augmented audio signal for speech recognition processing. In further embodiments, the method analyzes the augmented audio signal in order to locate starting and ending speech endpoints that bound at least a portion of speech to be processed for recognition. At least one of the speech endpoints is located using a Hidden Markov Model.

39 Claims, 5 Drawing Sheets

METHOD AND APPARATUS FOR OBTAINING COMPLETE SPEECH SIGNALS FOR SPEECH RECOGNITION APPLICATIONS

CROSS REFERENCE TO RELATED APPLICATIONS

This application claims the benefit of U.S. Provisional Patent Application No. 60/606,644, filed Sep. 1, 2004 (entitled “Method and Apparatus for Obtaining Complete Speech Signals for Speech Recognition Applications”), which is herein incorporated by reference in its entirety.

REFERENCE TO GOVERNMENT FUNDING

This invention was made with Government support under contract number DAAH01-00-C-R003, awarded by Defense Advance Research Projects Agency and under contract number NAG2-1568 awarded by NASA. The Government has certain rights in this invention.

FIELD OF THE INVENTION

The present invention relates generally to the field of speech recognition and relates more particularly to methods for obtaining speech signals for speech recognition applications.

BACKGROUND OF THE DISCLOSURE

The accuracy of existing speech recognition systems is often adversely impacted by an inability to obtain a complete speech signal for processing. For example, imperfect synchronization between a user’s actual speech signal and the times at which the user commands the speech recognition system to listen for the speech signal can cause an incomplete speech signal to be provided for processing. For instance, a user may begin speaking before he provides the command to process his speech (e.g., by pressing a button), or he may terminate the processing command before he is finished uttering the speech signal to be processed (e.g., by releasing or pressing a button). If the speech recognition system does not “hear” the user’s entire utterance, the results that the speech recognition system subsequently produces will not be as accurate as otherwise possible. In open-microphone applications, audio gaps between two utterances (e.g., due to latency or others factors) can also produce incomplete results if an utterance is started during the audio gap.

Poor endpointing (e.g., determining the start and the end of speech in an audio signal) can also cause incomplete or inaccurate results to be produced. Good endpointing increases the accuracy of speech recognition results and reduces speech recognition system response time by eliminating background noise, silence, and other non-speech sounds (e.g., breathing, coughing, and the like) from the audio signal prior to processing. By contrast, poor endpointing may produce more flawed speech recognition results or may require the consumption of additional computational resources in order to process a speech signal containing extraneous information. Efficient and reliable endpointing is therefore extremely important in speech recognition applications.

Conventional endpointing methods typically use short-time energy or spectral energy features (possibly augmented with other features such as zero-crossing rate, pitch, or duration information) in order to determine the start and the end of speech in a given audio signal. However, such features become less reliable under conditions of actual use (e.g., noisy real-world situations), and some users elect to disable endpointing capabilities in such situations because they contribute more to recognition error than to recognition accuracy.

Thus, there is a need in the art for a method and apparatus for obtaining complete speech signals for speech recognition applications.

SUMMARY OF THE INVENTION

In one embodiment, the present invention relates to a method and apparatus for obtaining complete speech signals for speech recognition applications. In one embodiment, the method continuously records an audio stream which is converted to a sequence of frames of acoustic speech features and stored in a circular buffer. When a user command to commence or terminate speech recognition is received, the method obtains a number of frames of the audio stream occurring before or after the user command in order to identify an augmented audio signal for speech recognition processing.

In further embodiments, the method analyzes the augmented audio signal in order to locate starting and ending speech endpoints that bound at least a portion of speech to be processed for recognition. At least one of the speech endpoints is located using a Hidden Markov Model.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for obtaining an improved audio signal for speech recognition processing, and to a method and apparatus for improved endpointing for speech recognition. In one embodiment, an audio stream is recorded continuously by a speech recognition system, enabling the speech recognition system to retrieve portions of a speech signal that conventional speech recognition systems might miss due to user commands that are not properly synchronized with user utterances.

In further embodiments of the invention, one or more Hidden Markov Models (HMMs) are employed to endpoint an audio signal in real time in place of a conventional signal processing endpointer. Using HMMs for this function enables speech start and end detection that is faster and more robust to noise than conventional endpointing techniques.

Figure 1:
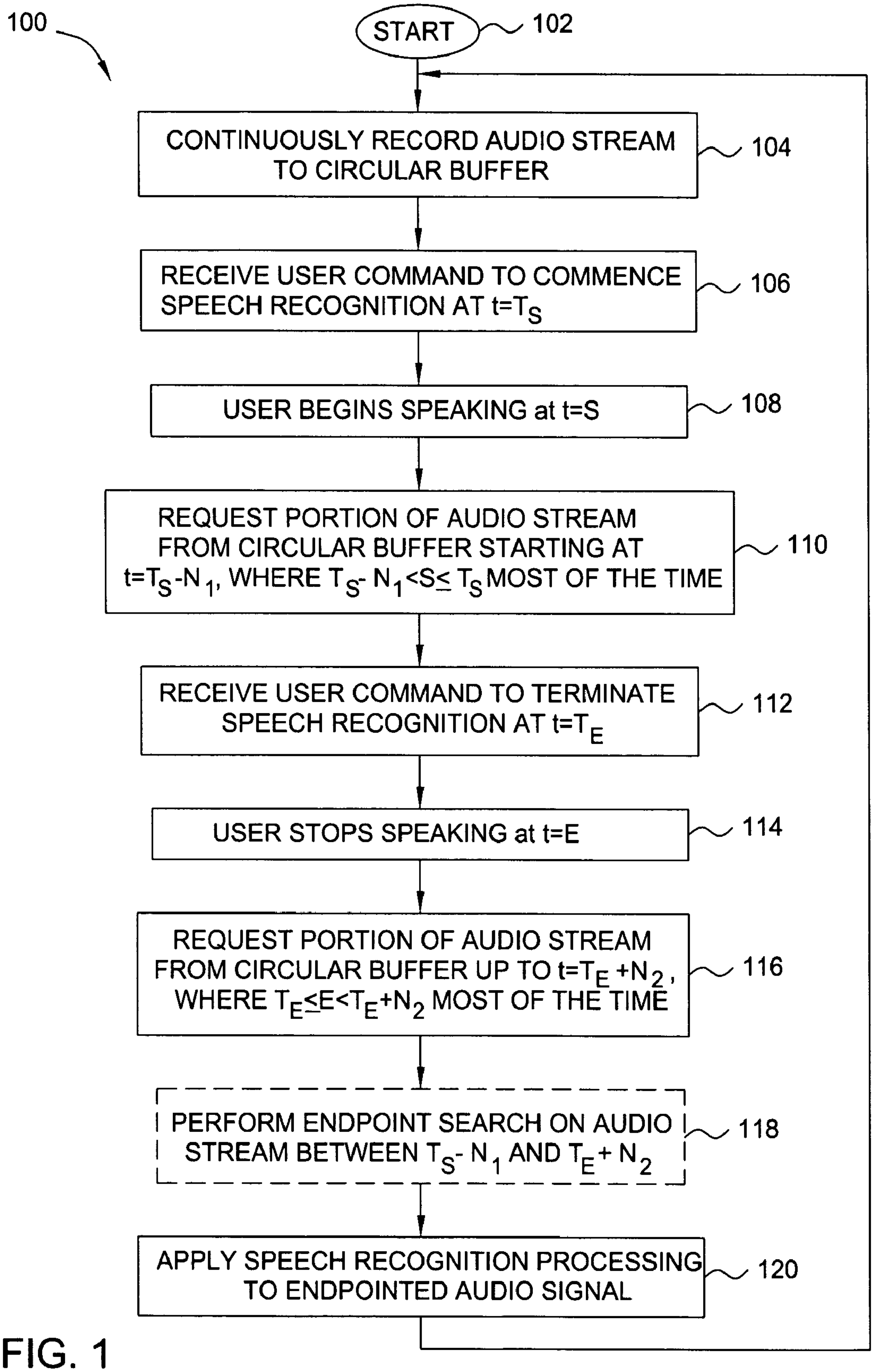
FIG. 1 is a flow diagram illustrating one embodiment of a method for speech recognition processing of an augmented audio stream, according to the present invention.

FIG. 1 is a flow diagram illustrating one embodiment of a method 100 for speech recognition processing of an augmented audio stream, according to the present invention. The method 100 is initialized at step 102 and proceeds to step 104, where the method 100 continuously records an audio stream (e.g., a sequence of audio frames containing user speech, background audio, etc.) to a circular buffer. In step 106, the method 100 receives a user command (e.g., via a button press or other means) to commence speech recognition, at time $t=T_S$.

In step 108, the user begins speaking, at time t=S. The user command to commence speech recognition, received at time $t=T_S$, and the actual start of the user speech, at time t=S, are only approximately synchronized; the user may begin speaking before or after the command to commence speech recognition received in step 106.

Once the user begins speaking, the method 100 proceeds to step 110 and requests a portion of the recorded audio stream from the circular buffer starting at time $t=T_S-N_1$, where $N_1$ is an interval of time such that $T_S-N_1<S\leqq T_S$ most of the time. In one embodiment, the interval $N_1$ is chosen by analyzing real or simulated user data and selecting the minimum value of $N_1$ that minimizes the speech recognition error rate on that data. In some embodiments, a sufficient value for $N_1$ is in the range of tenths of a second. In another embodiment, where the audio signal for speech recognition processing has been acquired using an open-microphone mode, $N_1$ is approximately equal to $T_s-T_P$, where $T_P$ is the absolute time at which the previous speech recognition process on the previous utterance ended. Thus, the current speech recognition process will start on the first audio frame that was not recognized in the previous speech recognition processing.

In step 112, the method 100 receives a user command (e.g., via a button press or other means) to terminate speech recognition, at time $t=T_E$. In step 114, the user stops speaking, at time t=E. The user command to terminate speech recognition, received at time $t=T_E$, and the actual end of the user speech, at time t=E, are only approximately synchronized; the user may stop speaking before or after the command to terminate speech recognition received in step 112.

In step 116, the method 100 requests a portion of the audio stream from the circular buffer up to time $t=T_E+N_2$, where $N_2$ is an interval of time such that $T_E\leqq E<T_E+N_2$ most of the time. In one embodiment, $N_2$ is chosen by analyzing real or simulated user data and selecting the minimum value of $N_2$ that minimizes the speech recognition error rate on that data. Thus, an augmented audio signal starting at time $T_S-N_1$ and ending at time $T_E+N_2$ is identified.

In step 118 (illustrated in phantom), the method 100 optionally performs an endpoint search on at least a portion of the augmented audio signal. In one embodiment, an endpointing search in accordance with step 118 is performed using a conventional endpointing technique. In another embodiment, an endpointing search in accordance with step 118 is performed using one or more Hidden Markov Models (HMMs), as described in further detail below in connection with FIG. 2.

In step 120, the method 100 applies speech recognition processing to the endpointed audio signal. Speech recognition processing may be applied in accordance with any known speech recognition technique.

The method 100 then returns to step 104 and continues to record the audio stream to the circular buffer. Recording of the audio stream to the circular buffer is performed in parallel with the speech recognition processes, e.g., steps 106-120 of the method 100.

The method 100 affords greater flexibility in choosing speech signals for recognition processing than conventional speech recognition techniques. Importantly, the method 100 improves the likelihood that a user's entire utterance is provided for recognition processing, even when user operation of the speech recognition system would normally provide an incomplete speech signal. Because the method 100 continuously records the audio stream containing the speech signals, the method 100 can "back up" or "go forward" to retrieve portions of a speech signal that conventional speech recognition systems might miss due to user commands that are not properly synchronized with user utterances. Thus, more complete and more accurate speech recognition results are produced.

Moreover, because the audio stream is continuously recorded even when speech is not being actively processed, the method 100 enables new interaction strategies. For example, speech recognition processing can be applied to an audio stream immediately upon command, from a specified point in time (e.g., in the future or recent past), or from a last detected speech endpoint (e.g., a speech starting or speech ending point), among other times. Thus, speech recognition can be performed, on the user's command, from a frame that is not necessarily the most recently recorded frame (e.g., occurring some time before or after the most recently recorded frame).

Figure 2:
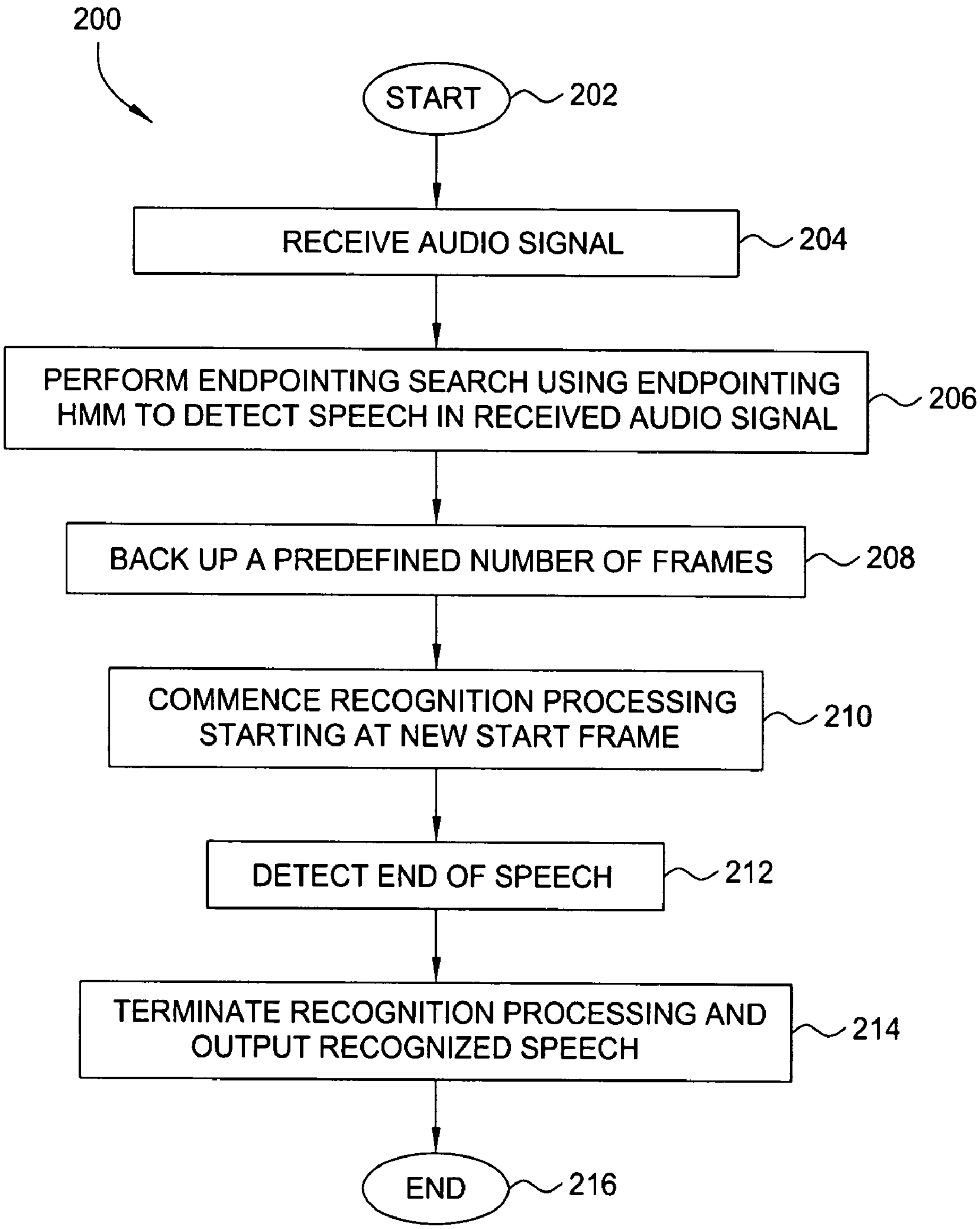
FIG. 2 is a flow diagram illustrating one embodiment of a method for performing endpoint searching and speech recognition processing on an audio signal.

FIG. 2 is a flow diagram illustrating one embodiment of a method 200 for performing endpoint searching and speech recognition processing on an audio signal, e.g., in accordance with steps 118-120 of FIG. 1. The method 200 is initialized at step 202 and proceeds to step 204, where the method 200 receives an audio signal, e.g., from the method 100.

In step 206, the method 200 performs a speech endpointing search using an endpointing HMM to detect the start of the speech in the received audio signal. In one embodiment, the endpointing HMM recognizes speech and silence in parallel, enabling the method 200 to hypothesize the start of speech when speech is more likely than silence. Many topologies can be used for the speech HMM, and a standard silence HMM may also be used. In one embodiment, the topology of the speech HMM is defined as a sequence of one or more reject "phones", where a reject phone is an HMM model trained on all types of speech. In another embodiment, the topology of the speech HMM is defined as a sequence (or sequence of loops) of context-independent (CI) or other phones. In further embodiments, the endpointing HMM has a pre-determined but configurable minimum duration, which may be a function of the number of reject or other phones in sequence in the speech HMM, and which enables the endpointer to more easily reject short noises as speech.

In one embodiment, the method 200 identifies the speech starting frame when it detects a predefined sufficient number of frames of speech in the audio signal. The number of frames of speech that are required to indicate a speech endpoint may be adjusted as appropriate for different speech recognition applications. Embodiments of methods for implementing an endpointing HMM in accordance with step 206 are described in further detail below with reference to FIGS. 3-4.

In step 208, once the speech starting frame, $F_{SD}$, is detected, the method 200 backs up a pre-defined number B of frames to a frame $F_S$ preceding the speech starting frame $F_{SD}$, such that $F_S=F_{SD}-B$ becomes the new "start frame" for the speech for the purposes of the speech recognition process. In one embodiment, the number B of frames by which the method 200 backs up is relatively small (e.g., approximately 10 frames), but is large enough to ensure that the speech recognition process begins on a frame of silence.

In step 210, the method 200 commences recognition processing starting from the new start frame $F_S$ identified in step 108. In one embodiment, recognition processing is performed in accordance with step 210 using a standard speech recognition HMM separate from the endpointing HMM.

In step 212, the method 200 detects the end of the speech to be processed. In one embodiment, a speech "end frame" is detected when the recognition process started in step 210 of the method 200 detects a predefined sufficient number of frames of silence following frames of speech. In one embodiment, the number of frames of silence that are required to indicate a speech endpoint is adjustable based on the particular speech recognition application. In another embodiment, the ending/silence frames might be required to legally end the speech recognition grammar, forcing the endpointer not to detect the end of speech until a legal ending point. In another embodiment, the speech end frame is detected using the same endpointing HMM used to detect the speech start frame. Embodiments of methods for implementing an endpointing HMM in accordance with step 212 are described in further detail below with reference to FIGS. 3-4.

In step 214, the method 200 terminates speech recognition processing and outputs recognized speech, and in step 216, the method 200 terminates.

Implementation of endpointing HMM's in conjunction with the method 200 enables more accurate detection of speech endpoints in an input audio signal, because the method 200 does not have any internal parameters that directly depend on the characteristics of the audio signal and that require extensive tuning. Moreover, the method 200 does not utilize speech features that are unreliable in noisy environments. Furthermore, because the method 200 requires minimal computation (e.g., processing while detecting the start and the end of speech is minimal), speech recognition results can be produced more rapidly than is possible by conventional speech recognition systems. Thus, the method 200 can rapidly and reliably endpoint an input speech signal in virtually any environment.

Moreover, implementation of the method 200 in conjunction with the method 100 improves the likelihood that a user's complete utterance is provided for speech recognition processing, which ultimately produces more complete and more accurate speech recognition results.

Figure 3:
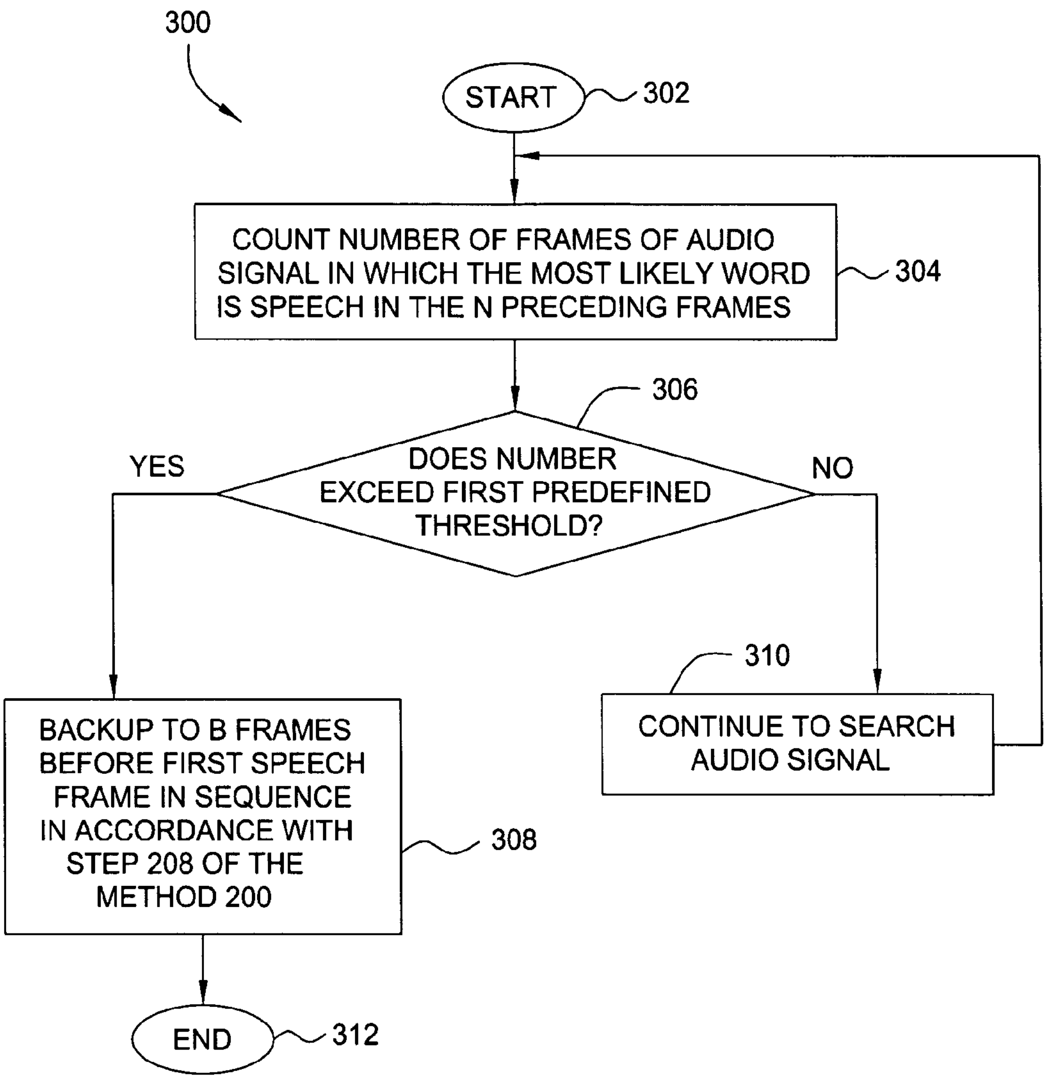
FIG. 3 is a flow diagram illustrating a first embodiment of a method for performing an endpointing search using an endpointing HMM, according to the present invention.

FIG. 3 is a flow diagram illustrating a first embodiment of a method 300 for performing an endpointing search using an endpointing HMM, according to the present invention. The method 300 may be implemented in accordance with step 206 and/or step 212 of the method 200 to detect endpoints of speech in an audio signal received by a speech recognition system.

The method 300 is initialized at step 302 and proceeds to step 304, where the method 300 counts a number, $F_1$, of frames of the received audio signal in which the most likely word (e.g., according to the standard HMM Viterbi search criteria) is speech in the last $N_1$ preceding frames. In one embodiment, $N_1$ is a predefined parameter that is configurable based on the particular speech recognition application and the desired results. Once the number $F_1$ of frames is determined, the method 300 proceeds to step 306 and determines whether the number $F_1$ of frames exceeds a first predefined threshold, $T_1$. Again, the first predefined threshold, $T_1$, is configurable based on the particular speech recognition application and the desired results.

If the method 300 concludes in step 306 that $F_1$ does not exceed $T_1$, the method 300 proceeds to step 310 and continues to search the audio signal for a speech endpoint, e.g., by returning to step 304, incrementing the location in the speech signal by one frame, and continuing to count the number of speech frames in the last $N_1$ frames of the audio signal. Alternatively, if the method 300 concludes in step 306 that $F_1$ does exceed $T_1$, the method 300 proceeds to step 308 and defines the first frame $F_{SD}$ of the frame sequence that includes the number ($F_1$) of frames as the speech starting point. The method 300 then backs up to a predefined number B of frames before the speech starting frame for speech recognition processing, e.g., in accordance with step 208 of the method 200. In one embodiment, values for the parameters $N_1$ and $T_1$ are determined to simultaneously minimize the probability of detecting short noises as speech and maximize the probability of detecting single, short words (e.g., "yes" or "no") as speech.

In one embodiment, the method 300 may be adapted to detect the speech stopping frame as well as the speech starting frame (e.g., in accordance with step 212 of the method 200). However, in step 304, the method 300 would count the number, $F_2$, of frames of the received audio signal in which the most likely word is silence in the last $N_2$ preceding frames. Then, when that number, $F_2$, meets a second predefined threshold, $T_2$, speech recognition processing is terminated (e.g., effectively identifying the frame at which recognition processing is terminated as the speech endpoint). In either case, the method 300 is robust to noise and produces accurate speech recognition results with minimal computational complexity.

Figure 4:
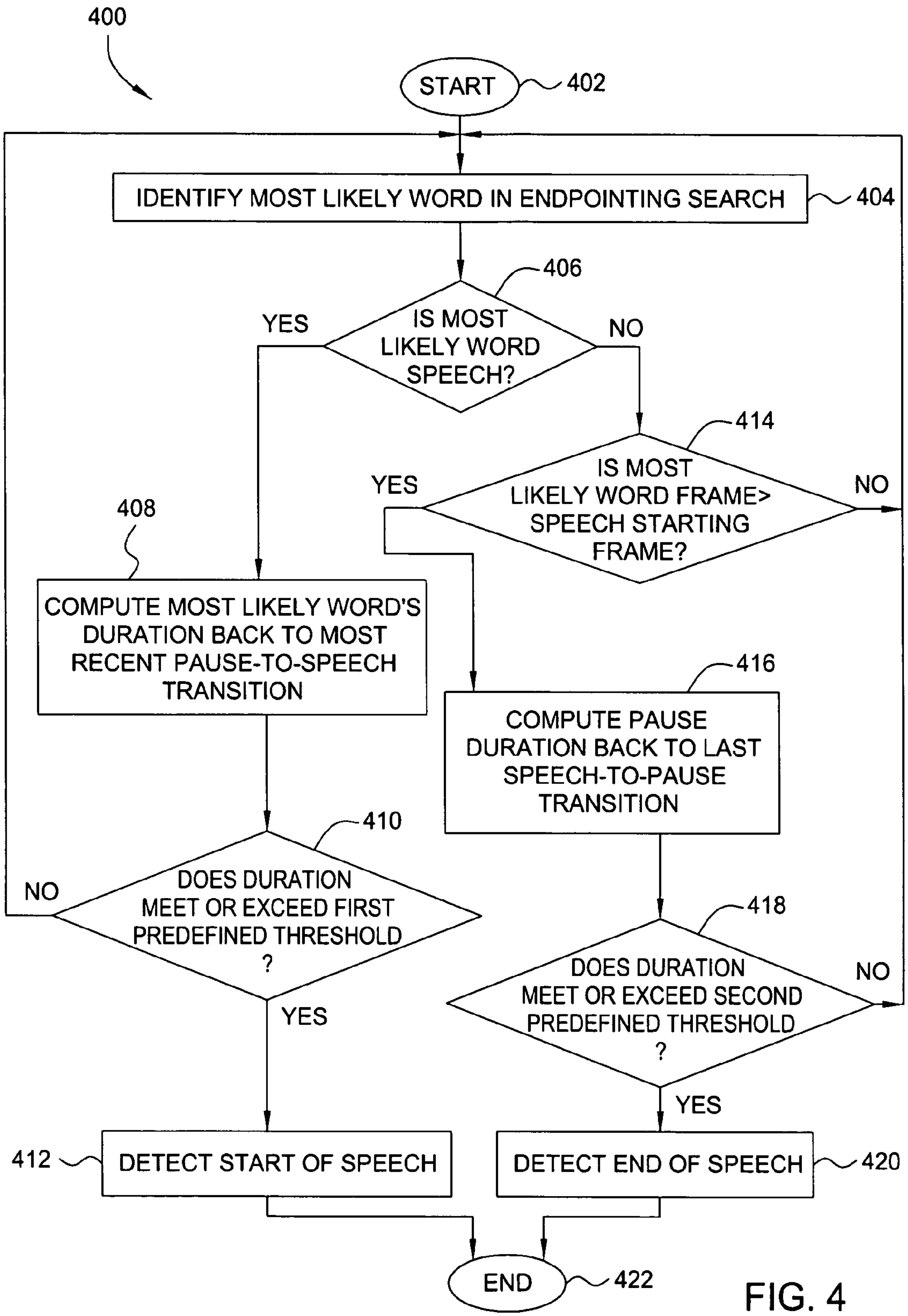
FIG. 4 is a flow diagram illustrating a second embodiment of a method for performing an endpointing search using an endpointing HMM, according to the present invention.

FIG. 4 is a flow diagram illustrating a second embodiment of a method 400 for performing an endpointing search using an endpointing HMM, according to the present invention. Similar to the method 300, the method 400 may be implemented in accordance with step 206 and/or step 212 of the method 200 to detect endpoints of speech in an audio signal received by a speech recognition system.

The method 400 is initialized at step 402 and proceeds to step 404, where the method 400 identifies the most likely word in the endpointing search (e.g., in accordance with the standard Viterbi HMM search algorithm).

In order to determine the speech starting endpoint, in step 406 the method 400 determines whether the most likely word identified in step 404 is speech or silence. If the method 400 concludes that the most likely word is speech, the method 400 proceeds to step 408 and computes the duration, $D_s$, back to the most recent pause-to-speech transition.

In step 410, the method 400 determines whether the duration $D_s$ meets or exceeds a first predefined threshold $T_1$. If the method 400 concludes that the duration $D_s$ does not meet or exceed $T_1$, then the method 400 determines that the identified most likely word does not represent a starting endpoint of the speech, and the method 400 processes the next audio frame and returns to step 404 and to continue the search for a starting endpoint.

Alternatively, if the method 400 concludes in step 410 that the duration $D_s$ does meet or exceed $T_1$, then the method 400 proceeds to step 412 and identifies the first frame $F_{SD}$ of the most likely speech word identified in step 404 as a speech starting endpoint. Note that according to step 208 of the method 200, speech recognition processing will start some number B of frames before the speech starting point identified in step 404 of the method 400 at frame $F_S = F_{SD} - B$. The method 400 then terminates in step 422.

To determine the speech ending endpoint, referring back to step 406, if the method 400 concludes that the most likely word identified in step 404 is not speech (i.e., is silence), the method 400 proceeds to step 414, where the method 400 confirms that the frame(s) in which the most likely word appears is subsequent to the frame representing the speech starting point. If the method 400 concludes that the frame in which the most likely word appears is not subsequent to the frame of the speech starting point, then the method 400 concludes that the most likely word identified in step 404 is not a speech endpoint and returns to step 404 to process the next audio frame and continue the search for a speech endpoint.

Alternatively, if the method 400 concludes in step 414 that the frame in which the most likely word appears is subsequent to the frame of the speech starting point, the method 400 proceeds to step 416 and computes the duration, $D_p$, back to the most recent speech-to-pause transition.

In step 418, the method 400 determines whether the duration, $D_p$, meets or exceeds a second predefined threshold $T_2$. If the method 400 concludes that the duration $D_p$ does not meet or exceed $T_2$, then the method 400 determines that the identified most likely word does not represent an endpoint of the speech, and the method 400 processes the next audio frame and returns to step 404 to continue the search for an ending enpoint.

However, if the method 400 concludes in step 418 that the duration $D_p$ does meet or exceed $T_2$, then the method 400 proceeds to step 420 and identifies the most likely word identified in step 404 as a speech endpoint (specifically, as a speech ending endpoint). The method 400 then terminates in step 422.

The method 400 produces accurate speech recognition results in a manner that is more robust to noise, but more computationally complex than the method 300. Thus, the method 400 may be implemented in cases where greater noise robustness is desired and the additional computational complexity is less of a concern. The method 300 may be implemented in cases where it is not feasible to determine the duration back to the most recent pause-to-speech or speech-to-pause transition (e.g., when backtrace information is limited due to memory constraints).

In one embodiment, when determining the speech ending frame in step 418 of the method 400, an additional requirement that the speech ending word legally ends the speech recognition grammar can prevent premature speech endpoint detection when a user utters a long pause in the middle of an utterance.

Figure 5:
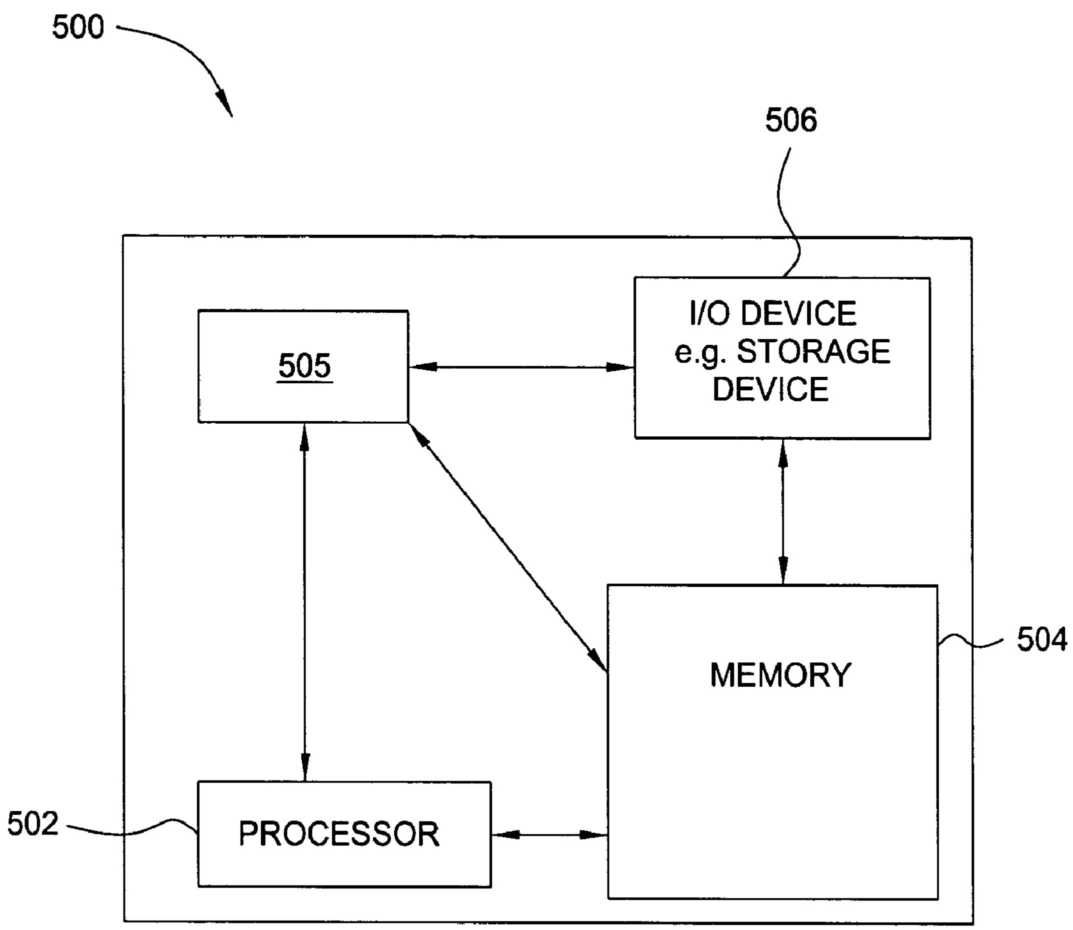
FIG. 5 is a high-level block diagram of the present invention implemented using a general purpose computing device.

FIG. 5 is a high-level block diagram of the present invention implemented using a general purpose computing device 500. It should be understood that the digital scheduling engine, manager or application (e.g., for endpointing audio signals for speech recognition) can be implemented as a physical device or subsystem that is coupled to a processor through a communication channel. Therefore, in one embodiment, a general purpose computing device 500 comprises a processor 502, a memory 504, a speech endpointer or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive).

Alternatively, the digital scheduling engine, manager or application (e.g., speech endpointer 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the speech endpointer 505 for endpointing audio signals described herein with reference to the preceding Figures can be stored on a computer readable medium or carrier (e.g., RAM, magnetic or optical drive or diskette, and the like).

The endpointing methods of the present invention may also be easily implemented in a variety of existing speech recognition systems, including systems using "hold-to-talk", "push-to-talk", "open microphone", "barge-in" and other audio acquisition techniques. Moreover, the simplicity of the endpointing methods enables the endpointing methods to automatically take advantage of improvements to a speech recognition system's acoustic speech features or acoustic models with little or no modification to the endpointing methods themselves. For example, upgrades or improvements to the noise robustness of the system's speech features or acoustic models correspondingly improve the noise robustness of the endpointing methods employed.

Thus, the present invention represents a significant advancement in the field speech recognition. One or more Hidden Markov Models are implemented to endpoint (potentially augmented) audio signals for speech recognition processing, resulting in an endpointing method that is more efficient, more robust to noise and more reliable than existing endpointing methods. The method is more accurate and less computationally complex than conventional methods, making it especially useful for speech recognition applications in which input audio signals may contain background noise and/or other non-speech sounds.

Although various embodiments which incorporate the teachings of the present invention have been shown and described in detail herein, those skilled in the art can readily devise many other varied embodiments that still incorporate these teachings.

What is claimed is:

1. A method for recognizing speech in an audio stream comprising a sequence of audio frames, the method comprising the steps of:

continuously recording said audio stream to a buffer;

receiving a command to recognize speech in a first portion of said audio stream, where said first portion of said audio stream occurs between a user-designated start point and a user-designated end point, and where said command is distinct from said audio stream;

augmenting said first portion of said audio stream with one or more audio frames of said audio stream that do not occur between said user-designated start point and said user-designated end point to form an augmented audio signal; and outputting a recognized speech in accordance with said augmented audio signal.

2. The method of claim 1, wherein said augmenting step comprises:

detecting a speech starting point in said audio stream at which a speech signal including said first portion of said audio stream actually starts; and augmenting said speech signal with one or more audio frames immediately preceding said user-designated start point to form said augmented audio signal.

3. The method of claim 2, wherein said augmented audio signal begins at an audio frame that occurs before said speech starting point, and said speech starting point occurs at or before said user-designated start point.

4. The method of claim 1, wherein said augmenting step comprises:

detecting a speech ending point in said audio stream at which a speech signal including said first portion of said audio stream actually ends;

augmenting said speech signal with one or more audio frames immediately following said user-designated end point to form said augmented audio signal.

5. The method of claim 4, wherein said augmented audio signal ends at an audio frame that occurs after said speech ending point, and said speech ending point occurs at or after said user-designated end point.

6. The method of claim 1, further comprising the steps of:

performing an endpointing search on said augmented audio signal; and applying speech recognition processing to the endpointed audio signal.

7. The method of claim 6, wherein said endpointing search comprises the steps of:

locating at least a first speech endpoint in said audio signal using a first Hidden Markov Model; and locating a second speech endpoint in said audio signal, such that at least a portion of said audio signal located between said first speech endpoint and said second speech endpoint represents speech.

8. The method of claim 7, wherein said second speech endpoint is located using said first Hidden Markov Model.

9. The method of claim 7, wherein said first speech endpoint is a speech starting point represented by a first frame of said audio signal and said second speech endpoint is a speech ending point represented by a second frame of said audio signal, said second frame occurring subsequent to said first frame.

10. The method of claim 9, further comprising the step of:

backing up a pre-defined number of frames to a third frame of said audio signal that precedes said first frame; and performing speech recognition processing on at least a portion of said audio signal located between said third speech endpoint and said second speech endpoint.

11. The method of claim 10, wherein said speech recognition processing is performed using a second Hidden Markov Model.

12. The method of claim 10, wherein said step of locating at least a first speech endpoint comprises:

counting a number of frames of said audio signal for which a most likely word in a pre-defined quantity of preceding frames is speech;

determining whether said number of frames exceeds a first pre-defined threshold; and identifying a starting frame of said number of frames as a speech starting point, if said number of frames exceeds said first pre-defined threshold.

13. The method of claim 9, wherein said step of locating a second speech endpoint comprises:

counting a number of frames of said audio signal for which a most likely word in a pre-defined quantity of preceding frames is silence;

determining whether said number of frames exceeds a second pre-defined threshold; and identifying a starting frame of said number of frames as a speech ending point, if said number of frames exceeds said first pre-defined threshold.

14. The method of claim 7, wherein said step of locating at least a first speech endpoint comprises:

identifying a most likely word in said audio signal; and determining whether a duration of said most likely word is long enough to indicate that said most likely word represents said first speech endpoint.

15. The method of claim 14, wherein said identifying step comprises:

recognizing said most likely word as either speech or silence.

16. The method of claim 14, wherein said determining step comprises:

computing said most likely word's duration back to a most recent pause-to-speech transition in said audio signal, if said most likely word is speech; and identifying said most likely word as a speech starting point if said duration meets or exceeds a first pre-defined threshold.

17. The method of claim 14, wherein said determining step comprises:

computing said most likely word's duration back to a most recent speech-to-pause transition in said audio signal, if said most likely word is silence;

verifying that an audio signal frame containing said most likely word is subsequent to an audio signal frame containing a speech starting point; and identifying said most likely word as a speech ending point if said duration meets or exceeds a second pre-defined threshold.

18. The method of claim 14, wherein the step of identifying a most likely word comprises:

identifying a most likely stopping word for speech in said audio signal, where said most likely stopping word represents a potential speech ending point; and selecting a predecessor word of said most likely stopping word as said most likely word in said audio signal.

19. The method of claim 7, wherein said endpointing search is improved by improving at least one acoustic model implemented therein.

20. The method of claim 1, further comprising:

receiving a command to recognize speech starting from a specific frame in said audio stream, where said specific frame is recorded some time before or after a most recently recorded frame.

21. A computer readable storage medium containing an executable program for recognizing speech in an audio stream comprising a sequence of audio frames, where the program performs the steps of:

continuously recording said audio stream to a buffer;

receiving a command to recognize speech in a first portion of said audio stream, where said first portion of said audio stream occurs between a user-designated start point and a user-designated end point, and where said command is distinct from said audio stream;

augmenting said first portion of said audio stream with one or more audio frames of said audio stream that do not occur between said user-designated start point and said user-designated end point to form an augmented audio; and outputting a recognized speech in accordance with said augmented audio signal.

22. The computer readable storage medium of claim 21, wherein said augmenting step comprises:

detecting a speech starting point in said audio stream at which a speech signal including said first portion of said audio stream actually starts; and augmenting said speech signal with one or more audio frames immediately preceding said user-designated start point to form said augmented audio signal.

23. The computer readable storage medium of claim 22, wherein said augmented audio signal begins at an audio frame that occurs before said speech starting point, and said speech starting point occurs at or before said user-designated start point.

24. The computer readable storage medium of claim 21, wherein said augmenting step comprises:

detecting a speech ending point in said audio stream at which a speech signal including said first portion of said audio stream actually ends;

augmenting said speech signal with one or more audio frames immediately following said user-designated end point to form said augmented audio signal.

25. The computer readable storage medium of claim 24, wherein said augmented audio signal ends at an audio frame that occurs after said speech ending point, and said speech ending point occurs at or after said user-designated end point.

26. The computer readable storage medium of claim 21, further comprising the steps of:

performing an endpointing search on said augmented audio signal; and applying speech recognition processing to the endpointed audio signal.

27. The computer readable storage medium of claim 26, wherein said endpointing search comprises the steps of:

locating at least a first speech endpoint in said audio signal using a first Hidden Markov Model; and locating a second speech endpoint in said audio signal, such that at least a portion of said audio signal located between said first speech endpoint and said second speech endpoint represents speech.

28. The computer readable storage medium of claim 27, wherein said second speech endpoint is located using said first Hidden Markov Model.

29. The computer readable storage medium of claim 27, wherein said first speech endpoint is a speech starting point represented by a first frame of said audio signal and said second speech endpoint is a speech ending point represented by a second frame of said audio signal, said second frame occurring subsequent to said first frame.

30. The computer readable storage medium of claim 29, further comprising the step of:

backing up a pre-defined number of frames to a third frame of said audio signal that precedes said first frame; and performing speech recognition processing on at least a portion of said audio signal located between said third speech endpoint and said second speech endpoint.

31. The computer readable storage medium of claim 30, wherein said speech recognition processing is performed using a second Hidden Markov Model.

32. The computer readable storage medium of claim 29, wherein said step of locating at least a first speech endpoint comprises:

counting a number of frames of said audio signal for which a most likely word in a pre-defined quantity of preceding frames is speech;

determining whether said number of frames exceeds a first pre-defined threshold; and identifying a starting frame of said number of frames as a speech starting point, if said number of frames exceeds said first pre-defined threshold.

33. The computer readable storage medium of claim 29, wherein said step of locating a second speech endpoint comprises:

counting a number of frames of said audio signal for which a most likely word in a pre-defined quantity of preceding frames is silence;

determining whether said number of frames exceeds a second pre-defined threshold; and identifying a starting frame of said number of frames as a speech ending point, if said number of frames exceeds said first pre-defined threshold.

34. The computer readable storage medium of claim 27, wherein said step of locating at least a first speech endpoint comprises:

identifying a most likely word in said audio signal; and determining whether a duration of said most likely word is long enough to indicate that said most likely word represents said first speech endpoint.

35. The computer readable storage medium of claim 34, wherein said identifying step comprises:

recognizing said most likely word as either speech or silence.

36. The computer readable storage medium of claim 34, wherein said determining step comprises:

computing said most likely word's duration back to a most recent pause-to-speech transition in said audio signal, if said most likely word is speech; and identifying said most likely word as a speech starting point if said duration meets or exceeds a first pre-defined threshold.

37. The computer readable storage medium of claim 34, wherein said determining step comprises:

computing said most likely word's duration back to a most recent speech-to-pause transition in said audio signal, if said most likely word is silence;

verifying that an audio signal frame containing said most likely word is subsequent to an audio signal frame containing a speech starting point; and identifying said most likely word as a speech ending point if said duration meets or exceeds a second pre-defined threshold.

38. The computer readable storage medium of claim 34, wherein the step of identifying a most likely word comprises:

identifying a most likely stopping word for speech in said audio signal, where said most likely stopping word represents a potential speech ending point; and selecting a predecessor word of said most likely stopping word as said most likely word in said audio signal.

39. Apparatus for recognizing speech in an audio stream comprising a sequence of audio frames, the apparatus comprising:

recording means for continuously recording said audio stream to a buffer;

receiving means for receiving a command to recognize speech in a first portion of said audio stream, where said first portion of said audio stream occurs between a user-designated start point and a user-designated end point, and where said command is distinct from said audio stream;

augmenting means for augmenting said first portion of said audio stream with one or more audio frames of said audio stream that do not occur between said user-designated start point and said user-designated end point to form an augmented audio signal; and output means for outputting a recognized speech in accordance with said augmented audio signal.

* * * * *